July 26, 1932. W. F. HEALY 1,869,195
METHOD AND APPARATUS FOR ASSEMBLING DISKS OR FINS ON TUBES
Filed Oct. 14, 1926 2 Sheets-Sheet 1
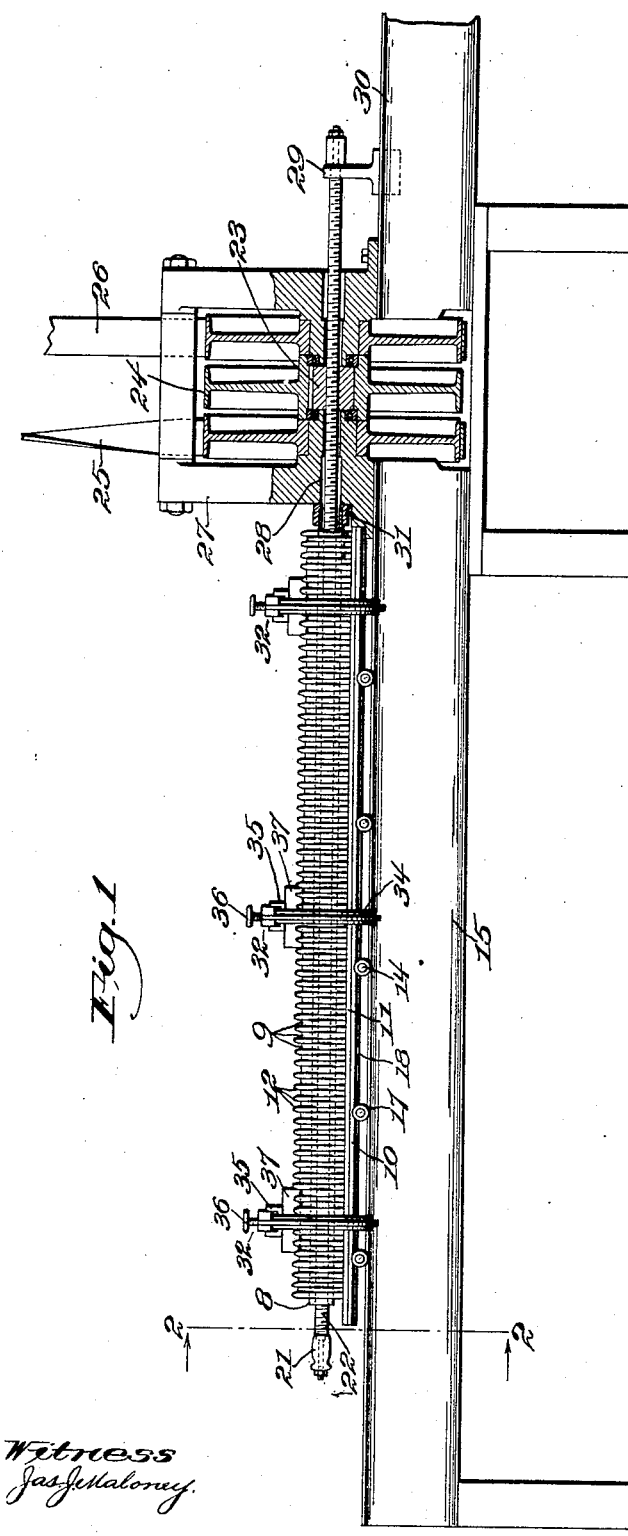

July 26, 1932.  W. F. HEALY  1,869,195
METHOD AND APPARATUS FOR ASSEMBLING DISKS OR FINS ON TUBES
Filed Oct. 14, 1926  2 Sheets-Sheet 2
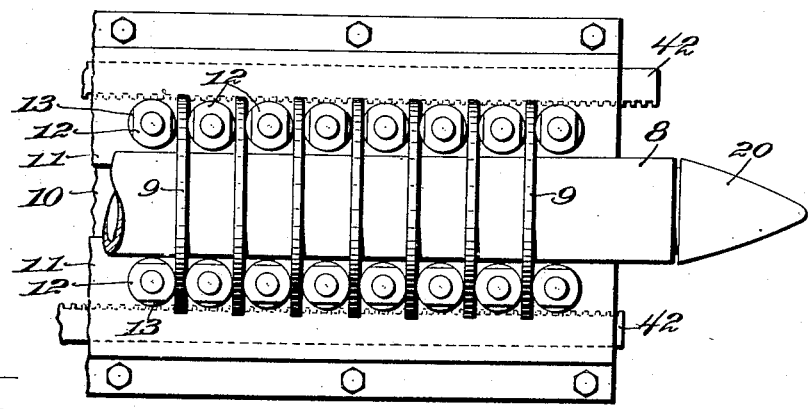
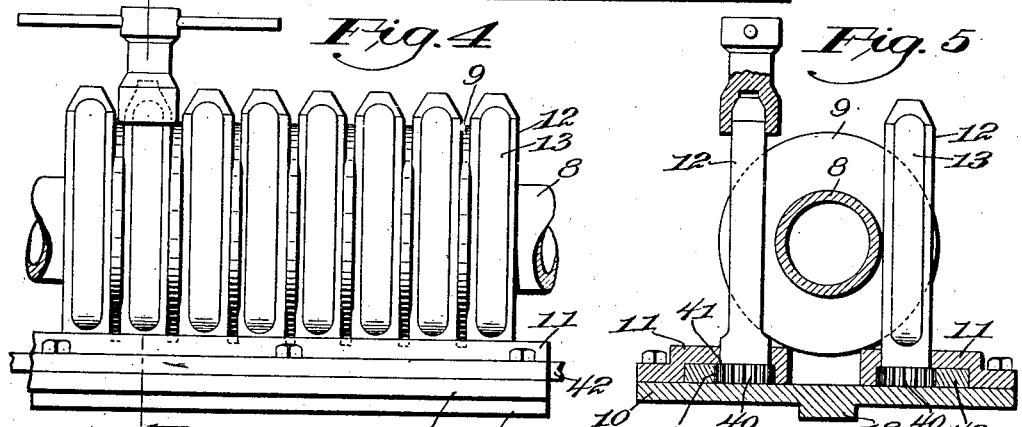
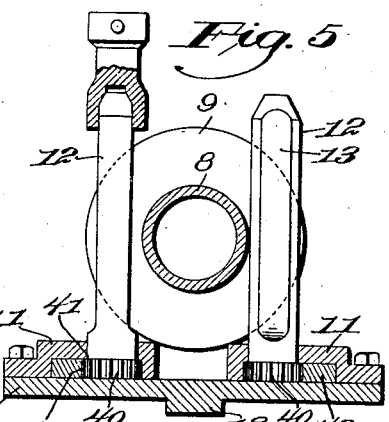
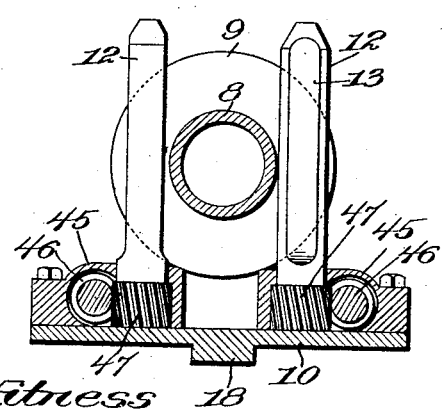
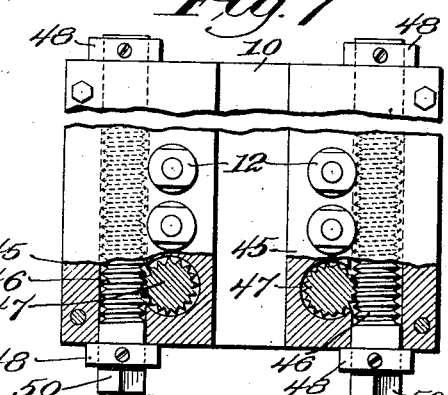
Inventor
William F. Healy Patented July 26, 1932

1,869,195

UNITED STATES PATENT OFFICE

WILLIAM F. HEALY, OF BOSTON, MASSACHUSETTS, ASSIGNOR TO B. F. STURTEVANT COMPANY, OF BOSTON, MASSACHUSETTS, A CORPORATION OF MASSACHUSETTS

METHOD AND APPARATUS FOR ASSEMBLING DISKS OR FINS ON TUBES

Application filed October 14, 1926. Serial No. 141,593.

The present invention relates to methods and apparatus for assembling disks or fins on tubes and is more particularly concerned with the formation of tubes having extended surfaces to facilitate transfer of heat between fluids, such as may be used in radiators, superheaters, economizers, and the like.

The object of the present invention is to provide a simple method and apparatus for assembling disks on tubes in spaced axial relation and in proper axial and angular alinement.

With this object in view, the present invention comprises particularly a tool or jig for maintaining a plurality of annular disks at spaced axial distances and in proper axial and angular alinement to receive a tube which is passed longitudinally through the central openings of the disks. The axial separation of the disks is afforded, according to one feature of the invention, through the provision of a plurality of positioning devices which are arranged loosely to receive the disks, together with means adapted to be operated after insertion of the tube through the disks to clamp the disks firmly in their proper spaced position while assembled on the tube.

The clamping action according to the present invention is preferably afforded by the construction of the positioning devices which are arranged to permit loose mounting of the disks and thereafter to be actuated to exert a clamping action thereon. The clamping of any disk takes place by the movement of immediately adjacent positioning devices and is not dependent upon the actuation or movement of any of the other positioning devices of the apparatus so that the axial spacing of the disks is unaffected by the operation of the clamping means.

Prior to the insertion of the tube, substantial axial alinement is afforded, according to another feature of the invention, by the provision of means for securing a transverse positioning of the disks so that the tube may be readily passed through the central openings thereof. In order to compensate for any slight mis-alinement which may occur between the various disks, the passing of the tube through the openings is facilitated by the provision of means attached to the tube for automatically alining the disks as the tube is inserted. This means is conveniently in the form of a pointed dummy head which may be attached to one end of the tube and which may be removed after the tube and the disks are assembled in proper relation for the expanding operation.

After the positioning of the tube and disks, the expanding operation to set the walls of the tube firmly against the disks is preferably carried out by passing through the tube a tool of slightly larger external diameter than the bore of the tube. During this operation provision is made for preventing longitudinal movement of the tube through the frictional engagement of the tool with the internal wall of the tool.

In the accompanying drawings illustrating the preferred form of the invention, Fig. 1 is a side elevation partly in section of an apparatus for assembling apertured fins or tubes, showing a tube and fins in position and the expanding tool ready to be drawn through the tube; Fig. 2 is a section on line 2—2 of Fig. 1; Fig. 3 is a plan view of a portion of the apparatus shown in Fig. 1 illustrating in addition a means for simultaneously actuating a plurality of the clamping posts; Fig. 4 is an elevation of the apparatus shown in Fig. 3; Fig. 5 is a section on line 5—5 of Fig. 4; Fig. 6 is a sectional end elevation of another modification of the invention, and Fig. 7 is a plan view, partly in section, of the apparatus shown in Fig. 6 but with the tube and fins removed.

The invention is herein illustrated and described as embodied in a method and apparatus for assembling apertured fins or disks upon tubes in a manner to provide an extended surface for heat interchange between water and gas. The construction of the tube with the disks assembled thereon is best shown in Fig. 3 in which the tube is indicated at 8, and the plurality of spaced disks are indicated at 9. The disks are assembled upon the tube and are firmly secured thereto by an internal expansion of the tube hereinafter more fully described in detail.

The apparatus for assembling the disks on the tube comprises a carriage 10 to which is secured at opposite sides longitudinal bearing plates 11 in which are journalled a plurality of clamping or positioning posts 12. These posts are of slabbed cylindrical form each having flat sides 13 and when set as shown in the rear row of Fig. 3, with their slabbed surfaces perpendicular to the axes of the disks, are arranged loosely to receive a plurality of the disks. When rotated through a quarter turn, the slabbed surfaces become parallel to the axes of the disks and exert a clamping action on the latter to hold them firmly in position. The disks when assembled between positioning posts assume the position shown in Fig. 2, being maintained in proper axial alinement by the engagement of their edges with the corners of the bearing plates 11 which serve as gages to position the disks in a transverse direction. The carriage 10 is mounted for longitudinal movement upon rollers 14 and rest upon an I beam frame 15, the rollers being formed with enlarged portions 16 to engage with both the frame and the carriage. The rollers are provided at their ends with suitable retaining disks 17 engaging with the sides of the I beams to maintain them properly positioned on the frame and the carriage is provided with a longitudinal depending lug 18 engaging between two shoulders formed at the ends of a reduced portion 19 of each roller in order to prevent transverse movement of the carriage.

The tube is assembled by placing a series of disks between the clamping posts while the latter are arranged with their slabbed surfaces as shown in the rear row of Fig. 3 of the drawings, the tube 8 being then inserted through the apertures of the disks. The operation of inserting the tube is facilitated by mounting a pointed dummy head 20 in the forward end of the tube. When the disks are assembled in their proper longitudinal relation on the tube the disks are then firmly clamped by rotation of the positioning posts through an angle of 90°. In the apparatus shown in Figs. 1 and 2, independent rotation of the clamping posts is effected by means of a wrench engaging the top of each of the posts.

The operation of expanding the tube to secure the disks firmly thereon is accomplished by means of an expanding tool 21 which is drawn through the tube by a longitudinal screw 22. The screw is caused to undergo longitudinal movement by means of a rotatable nut 23 through which the screw is threaded. The nut is rotated by a pulley 24 which has provision for remaining stationary or for rotation in either a forward or reverse direction. For this purpose, the pulley 24 is associated with forward and reverse belts 25 and 26 which are adapted to run on idler pulleys or on the pulley 24 as may be desired and as will be obvious to those skilled in the art.

The nut 23 and the mechanism for operating it are mounted in a suitable frame 27 having an opening 28 through which the screw is adapted to pass. The free end of the screw is mounted upon a standard 29 which has provision for a free sliding movement over an I beam frame 30 similar to the frame 15 on which the tube and disk assembly is mounted. In order to prevent longitudinal movement of the tube during the expanding operation, a bushing 31 is mounted on the forward end of the tube. The bushing fits closely over the tube at its end, with an inwardly extending lip on its forward end to engage the end of the tube. The bushing is of substantial radial thickness to give a firm bearing against the frame of the screw driving mechanism. This feature adapts the apparatus for expanding tubes of any desired size, the screw opening 28 being made of sufficient diameter to permit passage therethrough of the largest size expanding tool which is likely to be used while the bushing 31 may readily be formed of a size to provide a bearing surface for preventing longitudinal movement of the tube.

During the expanding operation buckling of the tube which might be caused by the passage of the tool therethrough is prevented by a plurality of clamping devices 32. These clamping devices are formed with arms 34 and are adapted to engage with the under surfaces of the I beams. At the top of the clamp there is provided a block 35 which is forced by means of a hand screw 36 into engagement with a wooden block 37 resting upon a plurality of the disks. By this means, tubes of considerable length may be safely expanded without imparting any curvature thereto.

At the completion of the expanding operation the tool 21 passes into the opening 28 of the frame 27, thus freeing the tube and after the clamping devices 32 are removed the carriage 10 may be moved on the rollers over the frame 15 to a postion where the tube may be conveniently removed. This is accomplished by loosening the separate positioning posts whereupon the tube with the disks assembled thereon may be lifted out from the apparatus. The nut 23 is then rotated in the reverse direction to start the screw back to its original position. After the tool is clear of the opening 28, it is removed and the screw continues on its rearward movement passing through a new tube which has been previously placed in position.

In order to facilitate the clamping operation either of the modified forms of the invention shown in Figs. 3 to 7 may be used. In the construction shown in Figs. 3, 4 and 5 each post is formed at the bottom with a gear 40, which is slightly greater in diameter than that of the post proper, forming a shoulder 41 which prevents accidental removal of the post from the base of the apparatus. A rack 42 is slidingly received within the plate 11 and engages with all of the gears 40 of one row of posts. A similar construction is provided for the opposed row. Upon rotation of any one of the posts in the row, the connection, afforded by the rack serves to rotate all of the posts in that row and thus simultaneously to clamp all of the disks.

The apparatus shown in Figs. 6 and 7 is similar to that described above with the exception that the operation is carried out by a screw connection to the several posts of the two rows. In this form of the invention, each bearing plate 45 is formed with a longitudinal bore to receive a screw 46 which is adapted to engage with worm gears 47 cut on the bottoms of the clamping posts. The screw 46 is maintained against longitudinal movement by collars 48 secured at opposite ends thereof. A squared end 50 is provided for each screw, in order to permit application of a wrench or any similar tool for rotating the screw, thus causing simultaneous rotation of the clamping posts.

It will be noted that in the preferred form of clamping devices illustrated in the drawings and above described, the disks are clamped practically in the same positions in which they are preliminarily located. There is no reducing of the interval or spacing between adjacent disks so that the two disks at opposite ends of the tube remain the same distance apart that they were originally set.

It will also be noted that when the clamping devices are loosened after the tube has been expanded in the disks, each disk is completely released and freed from all engagement under pressure so that the tube with its disks may be lifted out of the machine without frictional resistance.

Having thus described the invention, what is claimed is:

1. A method of assembling apertured disks or fins which consists in mounting a plurality of disks in axial and angular alinement upon a tube, clamping the disks in fixed spaced relation lengthwise of the tube, clamping the tube at intervals throughout its length, and forcing an expanding tool through the tube.

2. An apparatus for assembling apertured integral disks on tubes having, in combination, means for alining the disks axially, opposed rows of combined positioning and clamping means to loosely receive and position the disks at spaced intervals and to clamp the disks in their initial position, and devices for positively actuating said last mentioned means.

3. An apparatus for assembling apertured disks on tubes having, in combination, opposed rows of positioning devices to loosely receive and position the disks at spaced axial intervals in a manner to receive a tube inserted axially therethrough, means for facilitating the passage of a tube through the disks comprising a pointed dummy head for the tube, the positioning devices having provision for clamping the disks in assembled relation on the tube, and means for actuating the devices preparatory to an expanding operation on the tube.

4. An apparatus for assembling disks on tubes having, in combination, opposed rows of rotatable positioning devices arranged to receive and position the disks at spaced axial intervals, and having provision for clamping the disks upon rotation thereof, the disks being adapted to receive a tube passing longitudinally therethrough, and actuating means connected with a row of positioning devices for simultaneously actuating the devices to clamp the disks while in assembled relation on the tube.

5. An apparatus for assembling disks on tubes having, in combination, a base, two opposed rows of rotatable positioning posts of irregular contour mounted on the base and adapted when in one position to loosely receive a plurality of disks at spaced axial intervals and to clamp the disks when rotating into a different position.

6. An apparatus for assembling disks on tubes comprising two opposed rows of rotatable cylindrical positioning posts each having a slabbed side and adapted to receive and to position a plurality of annular disks when the slabbed sides are substantially perpendicular to the axes of the disks to permit insertion of a tube through the openings of the disks, the positioning posts being rotatable to clamp the disks while in assembled relation on the tube.

7. An apparatus for assembling apertured disks on tubes having, in combination, movable means for holding a plurality of fins in axial and angular alinement upon a tube and adapted to be actuated to clamp the disks in fixed position against longitudinal and angular displacement, means for holding the tube against longitudinal movement, an expanding tool, and means for drawing the tool longitudinally through the tube.

8. An apparatus for assembling apertured disks on tubes having, in combination, two opposed rows of positioning posts to maintain a plurality of apertured disks in axial and angular alinement to permit insertion of a tube through the apertures thereof, an expanding tool, means for drawing the tool through the tube, and means for maintaining the tube against curvature by pressure applied at intervals lengthwise of the tube.

9. An apparatus for assembling disks on tubes having, in combination, two opposed rows of rotatable cylindrical positioning posts each having a slabbed side and adapted to receive and to position a plurality of annular disks when the slabbed sides are substantially perpendicular to the axes of the disks to permit insertion of a tube through the openings of the disks, actuating means connected with a plurality of the positioning posts, and means for operating the actuating means to rotate a plurality of the positioning posts simultaneously to clamp the disks while in assembled relation on the tube.

10. An apparatus for assembling disks on tubes having, in combination, a base, two opposed rows of rotatable cylindrical clamping posts journalled in the base, each post having a slabbed side, the posts being adapted to receive and to position a plurality of annular disks when the slabbed sides are perpendicular to the axes of the disks, a gear on each clamping post, and means associated with the gears for simultaneously rotating a plurality of clamping posts to move the slabbed sides thereof into substantially parallelism with the axes of the disks to clamp the latter.

11. An apparatus for assembling disks on tubes having, in combination, means for axially spacing and positioning a plurality of annular disks in a position to receive a tube, and means for transversely alining the disks comprising spaced, parallel plates supported on the base and on which the edge of each disk is adapted to rest.

12. A method of assembling apertured integral disks or fins upon a tube which consists in preliminarily positioning the disks in axial and angular alinement upon the tube, applying axial pressure to the disks to clamp the same fixedly in final position upon the tube, internally expanding the tube and thereafter simultaneously freeing the disks from all axial pressure.

13. An apparatus for assembling apertured integral disks on tubes comprising means to loosely receive and locate the disks in alinement in position to receive a tube passed longitudinally therethrough, a clamping device between each two adjacent disks, and means for positively actuating each clamping device to increase and to decrease its effective dimension normal to the disks to clamp the disks in position and to release them from all clamping pressure, respectively.

14. An apparatus for assembling apertured integral disks on tubes comprising means to loosely receive and locate the disks in alinement at spaced intervals in position to receive a tube passed longitudinally therethrough, clamping devices located between adjacent disks, and means connected with said devices for actuating the same to increase its effective dimension normal to the disks to clamp the disks.

15. An apparatus for assembling apertured integral disks on tubes, means for alining the disks axially, clamping devices located between adjacent disks, and means for actuating each clamping device to increase its effective width to clamp the disks and to decrease its effective width to release the disks.

In testimony whereof I have signed my name to this specification.

WILLIAM F. HEALY.